United States Patent [19]

Charles et al.

[11] Patent Number: 4,469,851

[45] Date of Patent: Sep. 4, 1984

[54] MOLDING COMPOSITION

[75] Inventors: John J. Charles, Neshanic Station; Suzanne B. Nelsen, Bergenfield, both of N.J.

[73] Assignee: GAF Corporation, Wayne, N.J.

[21] Appl. No.: 501,672

[22] Filed: Jun. 6, 1983

[51] Int. Cl.³ .................... C08L 67/02; C08L 67/06
[52] U.S. Cl. ................................. 525/444; 524/539
[58] Field of Search ........................................ 525/444

[56] References Cited

U.S. PATENT DOCUMENTS 3,907,926 9/1975 Brown ................................. 525/444
4,355,155 10/1982 Nelson ................................. 525/444

*Primary Examiner*—John C. Bleutge
*Assistant Examiner*—Patricia Short
*Attorney, Agent, or Firm*—Marilyn J. Maue; J. Gary Mohr; Joshua J. Ward

[57] ABSTRACT

Molding composition which is a blend of polybutylene terephthalate and segmented thermoplastic copolyester elastomer. The elastomer contains recurring polymeric long chain ester units derived from phthalic acids and long chain glycols and short chain ester units derived from phthalic acids and a mixture of 1,4-butanediol and 1,4-butenediol.

11 Claims, No Drawings

MOLDING COMPOSITION

BACKGROUND OF THE INVENTION

U.S. Pat. No. 3,907,926 and French Pat. No. 2,194,741 disclose blends of polybutylene terephthalate with thermoplastic copolyester which consists essentially of a multiplicity of recurring long chain ester units and short chain ester units joined head to tail through ester linkages. Long chain ester units of the copolyester polymers are disclosed as being represented by the structure:

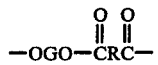

and said short chain ester units are represented by the structure:

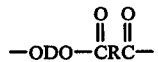

wherein:

G is a divalent radical remaining after removal of terminal hydroxyl groups from poly(alkylene oxide) glycols having a carbon-to-oxygen ratio of about 2.0–4.3 and molecular weight between about 400 to 6000;

R is a divalent radical remaining after removal of carboxyl groups from a dicarboxylic acid having a molecular weight less than about 300; and D is a divalent radical remaining after removal of hydroxyl groups from a low molecular weight diol having a molecular weight less than about 250.

Preferred copolyester for use in such blends is prepared from dimethyl terephthalate, 1,4-butanediol and polytetramethylene oxide glycol. A wide variety of other glycols, diols and acids suitable for use in making copolyester for blending with polybutylene terephthalate are also disclosed. The use of 1,4-butenediol in such copolyester is not, however, disclosed.

Various improvements in mechanical properties such as tear strength, tensile strength, flex modulus, low temperature impact strength and flexibility are alleged for the blends taught by the U.S. Pat. No. 3,907,926 and data is presented establishing improvement in physical properties for a preferred blend of polybutylene terephthalate with copolyester made from polytetramethylene ether glycol, 1,4-butanediol and dimethyl terephthalate as compared to the random copolymer itself.

U.S. Pat. No. 4,355,155 discloses segmented thermoplastic copolyester elastomers which are generally similar to preferred embodiments of the copolyester component of the U.S. Pat. No. 3,907,926 except that in the copolyester elastomer of the 4,355,155 patent the short chain ester units are derived from phthalic acis and a mixture of 1,4-butanediol and 1,4-butenediol.

While blends as taught by the above mentioned U.S. Pat. No. 3,907,926 have certain advantages, melt rheology shows that these blends form less stable melts than the random copolymers. Poor melt stability can result in processing difficulties. In fact, U.S. Pat. No. 3,907,926 requires that the polybutylene terephthalate used to form the blends have a melt index no greater than 50, and preferably between 1 and 25, g/10 min at 250° C., in order to avoid adversely affecting processing characteristics.

SUMMARY OF THE INVENTION

In accordance with the present invention it has now been found that blends of the general type disclosed in U.S. Pat. No. 3,907,926 may be formulated in such a way as to have unexpectedly superior melt stability while retaining the previously known improved mechanical properties of such blends. This is accomplished by formulating blends of PBT with thermoplastic copolyester elastomer of the type disclosed in U.S. Pat. No. 4,355,155.

In accordance with the invention a molding composition is provided which comprises a blend of:
  a. between about 5 and about 95 wt % polybutylene terephthalate, and
  b. between about 95 and about 5 wt % segmented thermoplastic copolyester elastomer which consists essentially of a multiplicity of recurring long chain ester units and short chain ester units joined head to tail through ester linkages, said long chain ester units being represented by the formula

 Formula I and said short chain ester units being represented by the formula

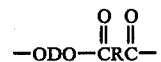 Formula II where G is a divalent radical remaining after the removal of the terminal hydroxyl groups from a difunctional polyether glycol having a number average molecular weight in the range from about 400 to about 6,000, R is a hydrocarbon radical remaining after removal of the carboxyl groups from terephthalic acid or isophthalic acid, and D is a divalent radical remaining after removal of hydroxyl groups from 1,4 butanediol or 1,4 butenediol; provided:
  (i) said short chain segments amount to between about 30% and about 85%, preferably 45–65% by weight, of the copolyester; and
  (ii) between about 10% and about 40% of the D groups, preferably between about 20% and about 30%, represent divalent radicals remaining after removal of hydroxyl groups from 1,4 butenediol.

In preferred embodiments of the invention, R is a hydrocarbon radical remaining after removal of carboxyl groups from terephthalic acid or from a mixture of terephthalic acid and isophthalic acid containing between about 1 and about 20% isophthalic acid based on the total of terephthalic acid and isophthalic acid and G is a divalent radical remaining after removal of terminal hydroxyl groups from poly(tetramethylene oxide) glycol.

DETAILED DESCRIPTION OF THE INVENTION

The long chain ester units of copolyester elastomer used in compositions of the invention are the reaction product of a long chain glycol with terephthalic acid or isophthalic acid. The long chain glycols are poly(alkylene oxide) glycols having terminal (or as nearly terminal as possible) hydroxyl groups and a number average molecular weight between about 400 and about 6,000, and preferably have a carbon to oxygen ratio of between about 2.0 to 1 and about 4.3 to 1. Representative long chain glycols available for use in making product of the invention include poly(ethylene oxide) glycol, poly(1,2- and 1,3-propylene oxide) glycol, and poly(tetramethylene oxide) glycol or random or block copolyetherglycols. Poly(tetramethylene oxide) glycol is a particularly preferred glycol for long chain ester units of the invention.

Short chain segments of copolyester elastomer used in product of the invention may be made by reacting a mixture of 1,4-butanediol and 1,4-butenediol with terephthalic acid, or isophthalic acid. In making both the long chain and short chain segments of product of the invention, the use of terephthalic acid is generally preferred with the use of between about 1 and about 20% isophthalic acid based on the total of terephthalic acid and isophthalic acid used being preferred when product of lower flexural modulus is desired. The relative amounts of each diol incorporated in the copolyester are largely a function of the amounts of each of the diols present in the reaction mixture, their boiling points and their relative reactivities.

The terms "terephthalic acid" and "isophthalic acid" as used herein are intended to include the condensation polymerization equivalent of such acids, i.e. their esters or ester-forming derivatives such as acid chlorides and anhydrides, or other derivatives which behave substantially like such acids in a polymerization reaction with a glycol. Dimethyl terephthalate and dimethyl isophthalate are for instance suitable starting materials for elastomers of the invention.

Copolyester for use in the invention can be made by conventional ester interchange reaction. A preferred procedure involves heating the dimethyl ester of terephthalic acid or of a mixture of terephthalic and isophthalic acids with a long chain glycol and a molar excess of a mixture of butanediol and butenediol in the presence of a catalyst at 150°–260° C. followed by distilling off of methanol formed by the interchange. Heating is continued until methanol evolution is complete. Depending upon temperature, catalyst and glycol excess, the polyerization is complete within a few minutes to a few hours. This procedure results in the preparation of a low molecular weight pre-polymer which can be carried to a high molecular weight copolyester by distillation of the excess of short chain diol in a conventional polycondensation reaction. Additional ester interchange occurs during this distillation to increase the molecular weight and to randomize the arrangement of the copolyester units. Best results are usually obtained if this final distillation or polycondensation is run at less than 1 mm pressure and 240°–260° C. for less than 2 hours in the presence of antioxidants such as sym-di-beta-naphthyl-p-phenylenediamine and 1,3,5-trimethyl-2,4-tris (3,5-ditertiary-butyl-4-hydroxybenzyl)benzene. Most practical polymerization techniques rely upon ester interchange to complete the polymerization reaction. In order to avoid excessive hold time at high temperatures with possible irreversible thermal degradation, it is advantageous to employ a catalyst for ester interchange reactions. While a wide variety of catalysts can be used, organic titanates such as tetrabutyl or tetraisopropyl titanate used alone or in combination with magnesium or calcium acetates are preferred. Complex titanates, such as derived from alkali or alkaline earth metal alkoxides and titanate ester are also very effective. Inorganic titanates, such as lanthanum titanate, calcium acetate/antimony trioxide mixtures and lithium and magnesium alkoxides are representative of other catalysts which can be used.

Copolyester prepolymers can also be prepared by a number of alternate esterification or ester interchange processes. For example, the long chain glycol can be reacted with a high or low molecular weight short chain ester homopolymer or copolymer in the presence of catalyst until randomization occurs. The short chain ester homopolymer or copolymer can be prepared by ester interchange from either the dimethyl esters and low molecular weight diols, as above, or from the free acids with the diol acetates. Alternatively, the short chain ester copolymer can be prepared by direct esterification from appropriate acids, anhydrides or acid chlorides, for example, with diols or by other processes such as reaction of the acids with cyclic ethers or carbonates. Obviously the prepolymer might also be prepared by running these processes in the presence of the long chain glycol.

Ester interchange polymerizations are generally run in the melt without added solvent, but inert solvents can be used to facilitate removal of volatile components from the mass at low temperatures. This technique is especially valuable during prepolymer preparation, for example, by direct esterification. However, certain low molecular weight diols, for example, butanediol in terphenyl, are conveniently removed during high polymerizationn by azeotropic distillation. Both batch and continuous methods can be used for any stage of copolyester polymer preparation. Polycondensation of prepolymer can also be accomplished in the solid phase by heating finely divided solid prepolymer in a vacuum or in a stream of inert gas to remove liberated low molecular weight diol. This method has the advantage of reducing degradation because it must be used at temperatures below the softening point of the prepolymer. The major disadvantage is the long time required to reach a given degree of polymerization.

Although the copolyesters useful in the invention possess many desirable properties, it is sometimes advisable to stabilize certain of the compositions to heat or radiation by ultraviolet light. This can be done by incorporating stabilizers in the polyester compositions. Satisfactory stabilizers comprise phenols and their derivatives, amines and their derivatives, compounds containing both hydroxyl and amine groups, hydroxyazines, oximes, polymeric phenolic esters and salts of multivalent metals in which the metal is in its lower state.

Representative phenol derivatives useful as stabilizers include 3,5-di-tert-butyl-4-hydroxy hydrocinnamic triester with 1,3,5-tris-(2-hydroxyethyl-s-triazine-2,4,6-(1H, 3H, 5H) trione, 4,4'-bis(2,6-ditertiary-butyl-phenyl), 1,3,5-trimethyl-2,4,6-tris (3,5-ditertiary-butyl-4-hydroxylbenzyl)benzene and 4,4'-butylidene-bis(6-tertiary-butyl-m-cresol). Various inorganic metal salts or hydroxides can be used as well as organic complexes such as nickel dibutyl dithiocarbamate, manganous salicylate and copper 3-phenyl-salicylate. Typical amine stabilizers include N,N'-bis (beta-naphthyl)-p-phenylenedianmine, N,N'-bis(1-methylheptyl)-p-phenylene diamine and either phenyl-beta-naphthyl amine or its reaction products with aldehydes. Mixtures of hindered phenols with esters of thiodipropionic acid, mercaptides and phosphite esters are particularly useful. Additional stabilization to ultraviolet light can be obtained by compounding with various UV absorbers such as substituted benzophenones, benzotriazoles or hindered amines.

Properties of compositions of the invention can be modified by incorporation of various conventional inorganic fillers such as carbon black, silica gel, alumina, clays and chopped fiberglass. In general, these additives have the effect of increasing the modulus of the material at various elongations. Other conventional additives such as flame retardants may also be used. Compositions having a range of hardness values can be obtained by varying the amount of long chain esters units present in the compositions. This can be accomplished by varying the proportions of PBT and copolyester elastomer or by varying the proportions of long and short chain ester units in the copolyester elastomer.

Compositions of the invention have superior melt stability while retaining good mechanical properties such as tear strength, abrasion resistance, tensile strength, flexural modulus, low temperature impact strength and flexibility, and the ability to crystallize at fast rates during molding operations. Melt stability is especially important where good reproducibility of product performance is desired. Compositions of the invention are especially suitable for use in manufacturing various articles such as tires, hoses, drive belts, gears, etc.

Polybutylene terephthalate (PBT) for use in forming compositions of the invention may be made in a conventional manner such as by transesterification and polycondensation of diemthyl terephthalate and 1,4-butanediol. Intrinsic viscosity and melt index of the PBT are not critical and variations in melt index of either the PBT or the elastomer do not appear to affect the mechanical properties of compositions of the invention. In preferred embodiments, however, the PBT used has a melt index between about 6 and about 90, more preferably between about 40 and about 90 by ASTM method D1238 at 250° C. employing a load of 2160 g and an intrinsic viscosity between about 0.6 and about 1.2 deciliters per gram (dl/g) as measured in orthochlorophenol at 25° C.

As mentioned compositions of the invention contain between about 5 and about 95 wt % PBT and between about 5 and about 95% copolyester elastomer. Preferred embodiments useful especially for wire coating contain between about 10 and about 50 wt % PBT based on PBT and elastomer.

Compositions of the invention are formed by blending PBT and copolyester elastomer to obtain a blend having the desired properties. Blending may be done in any suitable manner with extrusion blending being preferred. Suitable devices for the blending include single screw extruders, twin screw extruders, internal mixers such as the Banbury Mixer, heated rubber mills (electric or oil heat) or Farrell continuous mixers. Injection molding equipment can also be used to accomplish blending just prior to molding, but care must be taken to provide sufficient time and agitation to insure uniform blending prior to molding.

The following examples are intended to illustrate the invention without limiting the scope thereof.

As used herein, the following terms have the meanings given below.

DMT—dimethyl terephthalate
$B_1D$—1,4 butanediol
$B_2D$—1,4 butenediol
PTMEG—poly(tetramethylene oxide) glycol number average molecular weight 1,000
Goodrite 3125—trade name for 3,5-di-tert-butyl-4-hydroxyhydrocinnamic acid tri ester with 1,3,5-tris-(2-hydroxyethyl-s-triazine-2,4,6-1H, 3H, 5H) trione
TPT—tetra isopropyl titanate catalyst
Melt Stability—percent change in viscosity per minute as measured on a Monsanto rheometer at 250° C. In this test a result of 0 is ideal, representing a stable melt. Increasing negative values indicate that degradation during extrusion may occur while increasing positive values indicate that an increase of undesirable crosslinking may occur during extrusion.

All copolyester elastomers referred to in the following examples were made by placing appropriate amounts of DMT, $B_1D$, $B_2D$, PTMEG, Goodrite 3125 and TPT in a one gallon autoclave fitted for distillation and equipped with a mechanical stirrer and nitrogen inlet. A surplus of diol was used. The system was flushed with nitrogen and 17 inches of vacuum was applied during initial heating in which the mass was transesterfied at 200° C. for 30 minutes, by which time methanol distillation had slowed considerably. The temperature of the melt was then raised to the 225°–230° C. range where butenediol was included in the starting materials and to the 245°–250° C. range where butenediol was not included in the original starting materials. The melt was held at this temperature under high vacuum (less than 1 mm) until the desired molecular weight as determined by amperage ratings of about 2.5 was obtained. Specific amounts of materials used were adjusted to obtain elastomers wherein the short chain ester units made up 62 weight percent of the total of the long chain and short chain ester units in the elastomer (62 GT) and wherein the indicated percentages of the D groups of Formula II were derived from $B_1D$ and $B_2D$. A preferred elastomer of this type wherein 75 wt % of the D groups are derived from $B_1D$ and 25 wt % are derived from $B_2D$ was for instance made from the following ingredients:

| Ingredient | Mols | Grams |
| --- | --- | --- |
| DMT | 6.13 | 1189 |
| $B_1D$ | 4.98 | 448 |
| $B_2D$ | 2.34 | 206 |
| PTMEG | 0.65 | 650 |
| Goodrite 3125 | | 35 |
| TPT | | 1.3 |

Compositions of the invention referred to in the examples were made by extrusion blending on a 1½″ Waldron-Hartig extruder. The resins (pre-dried at 106° to 121° C. for a minimum of 4 hours) were fed to the extruder (with barrel and die temperatures set at 250° C.) equipped with a single-stage barrier flighted screw tipped with a Maddock mixing segment. The extruder was run at about 90 RPM yielding a melt temperature of 227°–240° C. and back pressure of 300–600 PSI. The strands produced were water quenched and pelletized.

Except for melt stability tests which were run using pellets, the tests reported below were performed on injection molded ASTM test specimens. These specimens were molded on a 50 ton Van Dorn reciprocating screw type molding machine, using dried (106° C. for 4 hours) pellets. Barrel and nozzle temperatures of 250°

Test results with respect to compositions A–E were as follows:

TABLE I

| Property | ASTM Test Procedure | A (PBT) | B (Elastomer with B₁D only) | C (Elastomer With B₁D and B₂D) | D (PBT + C) | E (PBT + B) |
|---|---|---|---|---|---|---|
| Tensile Strength at Yield (psi) | D-638 | 8,000 | 2190 | 2050 | 3460 | 3450 |
| Tensile Strength at Break (psi) | D-638 | — | — | 2750 | 3530 | 3590 |
| Elongation at Break (%) | D-648 | 25 | — | 340 | 300 | 340 |
| Flexural Modulus (psi) | D-790 | 330,000 | 30,000 | 28,000 | 89,000 | 87,000 |
| Heat Distortion Temperature at 264 psi (°C.) | D-648 | 54 | — | — | 47 | 49 |
| Melt Stability at 250° C. (Min⁻¹) | | −0.034 | −0.011 | −0.006 | +0.002 | −0.05 |

C. were used with screw RPM of 75 and injection pressures of 600–1000 PSI. The mold cycle consisted of 12–20 seconds of injection time and 10 seconds holding time with injection speed in the slow to moderate speed range.

EXAMPLE 1

In order to demonstrate the unique ability of compositions of the invention to combine the advantages of the type of blends taught by U.S. Pat. No. 3,907,926 with improved melt stability, a series of compositions were prepared and tested as described herein.

The compositions used in this example were as follows:

Composition A was PBT having an intrinsic viscosity of 0.6 dl/g and a melt index of 90 g/10 min. at 250° C.

Composition B was 62 GT copolyester elastomer of the type described above wherein 100% of the D groups of formula II were derived from B₁D.

Composition C was 62 GT copolyester elastomer of the type described above wherein 75% of the D groups of formula II were derived from B₁D and 25% from B₂D.

Composition D was in accordance with the invention and was a blend of 30 wt % of composition A (PBT) and 70 wt % of composition C (elastomer with B₁D and B₂D).

Composition E was a blend of 30 wt % of composition A (PBT) and 70 wt % of composition B (elastomer with B₁D only).

From the data presented in table I it can be seen that both of compositions D and E, which are blends of PBT and elastomer, have superior modulus. Only composition D, however, which used B₂D as well as B₁D in the elastomer portion in accordance with the invention, maintained superior melt stability.

EXAMPLE 2

In order to show that the advantages of compositions of the inventions are retained over a wide range of proportions of PBT and copolyester elastomer, additional compositions of the invention were made and tested as described below with results as indicated in table II. These additional compositions, identified herein as compositions F, G, H and J were prepared in the same manner as composition D except for using different amounts of PBT as shown in table II. Results for compositions A, C and D from table I are repeated in table II for ease of comparison.

TABLE II

| Property | ASTM Test Procedure | Composition | | | | | | |
| | | C | F | D | G | H | J | A |
|---|---|---|---|---|---|---|---|---|
| Amount PBT (%) | | 0 | 10 | 30 | 70 | 90 | 95 | 100 |
| Tensile Strength at Yield (psi) | D-638 | 2050 | no yield | 3460 | 5740 | 7530 | 7920 | 8000 |
| Tensile Strength at Break (psi) | D-638 | 2750 | 3410 | 3530 | — | 6380 | 7280 | — |
| Elongation at Break (%) | D-638 | 340 | 340 | 300 | 95 | 17 | 10 | 25 |
| Flexural Modulus (psi) | D-790 | 28,000 | 38,000 | 89,000 | 204,000 | 310,000 | 329,000 | 330,000 |
| Heat Distortion Temperature at 264 psi (°C.) | D-648 | — | 47 | 47 | 54 | 61 | 51 | 54 |
| Melt Stability at 250° C. (Min⁻¹) | | −0.006 | −0.012 | +0.002 | −0.0003 | −0.003 | −0.006 | −0.034 |

From table II it can be seen that the superior melt stability of compositions of the invention is obtained over a wide range of PBT content.

While the invention has been described above with respect to preferred embodiments thereof, it will be understood by those skilled the art that various changes and modifications may be made without departing from the spirit or scope of the invention.

What is claimed is:

1. Molding composition comprising a blend of:
   a. between about 5 and about 95 wt % polybutylene terephthalate; and b. between about 95 and about 5 wt % segmented thermoplastic copolyester elastomer which consists essentially of a multiplicity of recurring long chain ester units and short chain ester units joined head to tail through ester linkages, said long chain ester units being represented by the formula

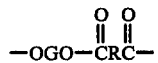

Formula I and said short chain ester units being represented by the formula

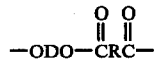

Formula II where G is a divalent radical remaining after the removal of the terminal hydroxyl groups from a difunctional polyether glycol having a number average molecular weight in the range from about 400 to about 6,000, R is a hydrocarbon radical remaining after removal of the carboxyl groups from terephthalic acid or isophthalic acid, and D is a divalent radical remaining after removal of hydroxyl groups from 1,4 butanediol or 1,4 butenediol; provided:
(i) said short chain segments amount to between about 30% and about 85% of the copolyester; and
(ii) between about 10% and about 40% of the D groups represent divalent radicals remaining after removal of hydroxyl groups from 1,4 butenediol.

2. Composition according to claim 1 wherein G is a divalent radical remaining after removal of terminal hydroxy groups from a difunctional polyether glycol having a carbon to oxygen ratio between about 2.0 and about 4.3 to 1.

3. Composition according to claim 1 wherein the short chain segments amount to between about 45 and about 65% by weight of the copolyester.

4. Composition according to claim 1 wherein between about 20 and about 30% of the D groups represent divalent radicals remaining after removal of hydroxyl groups from 1,4 butenediol.

5. Composition according to claim 4 wherein between about 1 and about 20% of the R groups are hydrocarbon radicals remaining after removal of the carboxyl groups from dimethyl isophthalic acid.

6. Composition according to claim 1 wherein G is a divalent radical remaining after removal of terminal hydroxyl groups from poly(tetramethylene oxide)-glycol.

7. Composition according to claim 1 wherein G is a divalent radical remaining after removal of terminal hydroxyl groups from poly(ethylene oxide) glycol.

8. Composition according to claim 5 wherein G is a divalent radical remaining after removal of terminal hydroxyl groups from poly(tetramethylene oxide) glycol.

9. Composition according to claim 1 wherein PBT is present in an amount between about 10 and about 50 wt % based on PBT and said elastomer.

10. Composition according to claim 1 wherein the PBT has an intrinsic viscosity between about 0.6 and about 1.2 dl/g.

11. Composition according to claim 10 wherein G is a divalent radical remaining after removal of terminal hydroxyl groups from poly(tetramethylene oxide) glycol.

* * * * *